(12) United States Patent
Ahmad

(10) Patent No.: US 12,188,410 B2
(45) Date of Patent: Jan. 7, 2025

(54) ICING CONDITION IDENTIFICATION FOR GAS TURBINE ENGINE

(71) Applicant: Pratt & Whitney Canada Corp., Longueuil (CA)

(72) Inventor: Zubair Ahmad, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/100,765

(22) Filed: Jan. 24, 2023

(65) Prior Publication Data

US 2024/0247612 A1 Jul. 25, 2024

(51) Int. Cl.
*F02C 7/047* (2006.01)
*F02C 9/00* (2006.01)

(52) U.S. Cl.
CPC ............... *F02C 7/047* (2013.01); *F02C 9/00* (2013.01); *F05D 2220/323* (2013.01); *F05D 2260/213* (2013.01); *F05D 2260/80* (2013.01); *F05D 2270/09* (2013.01)

(58) Field of Classification Search
CPC .... F02C 7/14; F02C 7/18; F02C 7/047; F02K 3/115; B64D 2013/0607; B64D 2013/0666; B64D 15/00–166; B64D 15/20–22
See application file for complete search history.

(56) References Cited

U.S. PATENT DOCUMENTS 10,082,243 B1 * 9/2018 Hagshenas .............. F02C 7/047
10,850,857 B2   12/2020 Scothern
2013/0008174 A1   1/2013 Gould et al.
2013/0305737 A1 * 11/2013 Jones ..................... F02C 7/08
                                                    60/39.093
2015/0285186 A1 * 10/2015 Roberge .................. F02C 7/14
                                                    60/39.83
2019/0023406 A1   1/2019 Scothern
2020/0189754 A1   6/2020 Jones et al.

FOREIGN PATENT DOCUMENTS

CN          103047010 A       4/2013

OTHER PUBLICATIONS

Extended European Search Report for Application No. EP 24153792 dated Jun. 7, 2024.

* cited by examiner

*Primary Examiner* — Andrew H Nguyen
(74) *Attorney, Agent, or Firm* — Carlson, Gaskey & Olds, P.C.

(57) ABSTRACT

A gas turbine engine includes a propulsor for providing air into a core engine housing, and for providing air as propulsion air. An aircraft fluid moves within an inlet to the gas turbine engine, and is exposed to inlet air at the inlet. There is a first temperature sensor for sensing a first temperature of the aircraft at a first upstream point and a second temperature sensor for sensing a second temperature of the aircraft fluid at a second downstream point where the aircraft fluid has been exposed to the inlet air for a period of time. A control determines a temperature differential between first and second temperatures sensed by the first and second temperature sensors, the temperature differential associated with a likelihood that an icing condition will occur. The control is programmed to take a corrective action should an icing condition be identified. A method is also disclosed.

15 Claims, 3 Drawing Sheets

ICING CONDITION IDENTIFICATION FOR GAS TURBINE ENGINE

BACKGROUND OF THE INVENTION

This application relates to a method and apparatus for detecting a possible icing condition associated with an inlet to a gas turbine engine.

Gas turbine engines are known, and typically include a propulsor such as a fan or propeller, delivering air into a core engine. With a fan the air is also delivered into a bypass duct. With a propeller the air is also delivered outwardly of the core engine. In either case the propulsor provides propulsion to an associated aircraft.

In the core engine there is at least one compressor rotor, a combustor and a turbine section. Compressed air is delivered into the combustor where it is mixed with fuel and ignited. Products of this combustion pass downstream over at least one turbine rotor, driving it to rotate. The turbine rotor in turn rotates the compressor and propulsor rotors.

As known, gas turbine engines associated with aircraft may be exposed to extreme temperature conditions. Thus, icing conditions are often encountered by an upstream end of the gas turbine engine associated with the propulsor. Such icing conditions can raise challenges.

During flight an aircraft associated gas turbine engine may be exposed to icing and ice may accumulate or otherwise form on surfaces of an air inlet into the bypass duct or into the core engine. The icing conditions may reduce the performance of the air inlet, and could actually present a risk of damage to downstream engine components if accumulated ice became dislodged.

There are anti-icing systems associated with gas turbine engines on aircrafts. As an example, hot air may be tapped from the compressor to surfaces that may be subject to icing. Moreover, the wings of the aircraft may have anti-icing features that will also provide relief to icing on the gas turbine engines.

SUMMARY OF THE INVENTION

A gas turbine engine includes a propulsor for providing air into a core engine housing, and for providing air as propulsion air radially outwardly of the core engine housing. The core engine housing surrounds a compressor section. A combustor is positioned downstream of the compressor section and a turbine section is positioned downstream of the combustor. An aircraft fluid moves within an inlet to the gas turbine engine, and is exposed to inlet air at the inlet. There is a first temperature sensor for sensing a first temperature of the aircraft fluid at a first upstream point and a second temperature sensor for sensing a second temperature of the aircraft fluid at a second downstream point where the aircraft fluid has been exposed to the inlet air for a period of time. A control determines a temperature differential between first and second temperatures sensed by the first and second temperature sensors. The temperature differential is associated with a likelihood that an icing condition will occur, and the control is programmed to take a corrective action should an icing condition be identified.

These and other features of the present invention can be best understood from the following specification and drawings, the following of which is a brief description.

DETAILED DESCRIPTION

Figure 1:
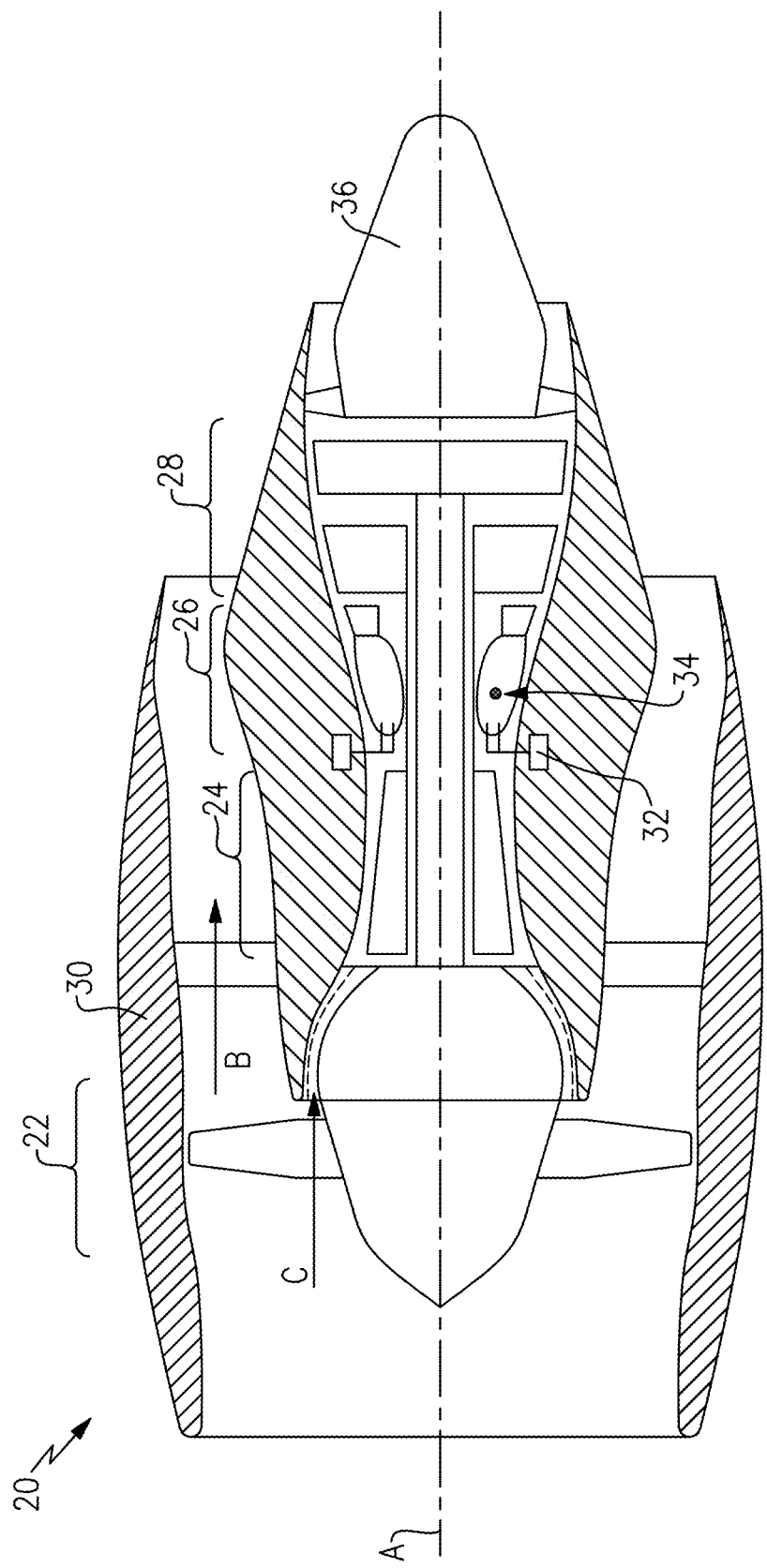
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. The fuel system 32 and the igniter 34 are mounted relative to an engine central longitudinal axis A. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller.

As mentioned above, an engine such as engine 20 may be subject to icing conditions during use on an aircraft. The icing conditions could be a function of a current atmospheric state. As examples, outside air temperature, altitude, air pressure, etc. all contribute to creating potential icing conditions. Also the operational states of the gas turbine engine and the associated aircraft impact conditions. Examples of such operational states include if the aircraft is at cruise, takeoff, landing, etc.

When icing conditions are anticipated an aircraft pilot may take steps to mitigate the risks involved with accumulated ice. As mentioned above, some gas turbine engines may include anti-icing or de-icing equipment which may be operated to reduce ice accumulation.

While mitigating actions and anti-deicing equipment may reduce the risks associated with icing conditions they may also present undesirable limitations on the gas turbine engine operation, as well as reducing gas turbine engine efficiency and performance.

As such, Applicant has recognized that it may be desirable to be able to accurately determine whether a gas turbine engine and air inlet is or is not exposed to icing condition. With an accurate determination the gas turbine engine can be optimally operated during icing conditions and non-icing conditions.

Figure 2:
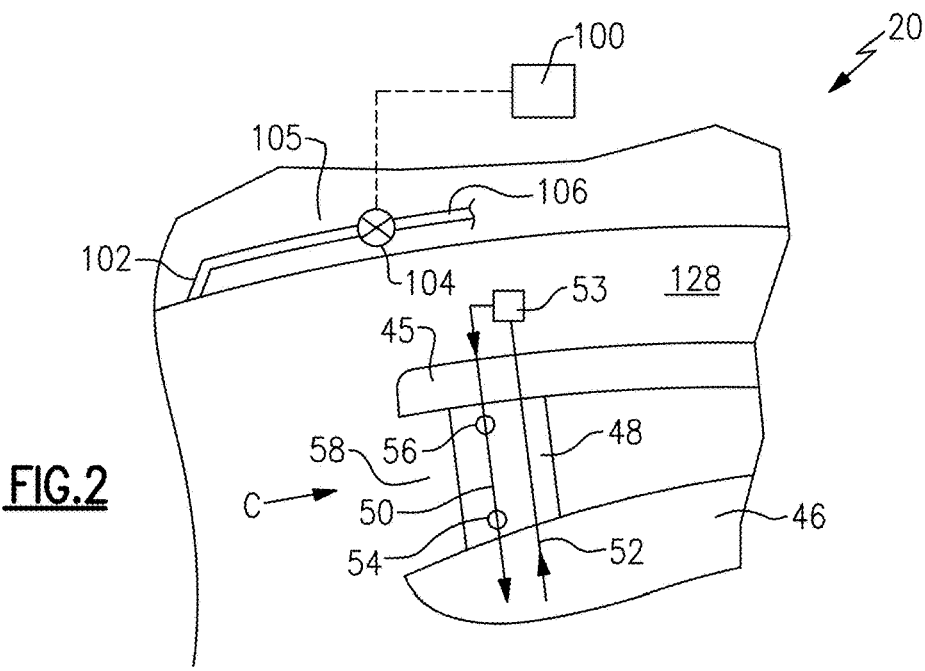
FIG. 2 shows a portion of the FIG. 1 engine.

FIG. 2 shows an air inlet to the engine 20 of FIG. 1. A strut 48 extends between an inner periphery of a core housing 45 and an inner housing 46. A fluid conduit extends through the strut 48, and has a first conduit 52 extending radially outwardly to a heat exchanger 53 positioned in the bypass duct 128. An aircraft fluid, which may be oil at a relatively high temperature, is routed through conduit 52, to the heat exchanger 53, and then back through a second conduit 50 into the housing 46. As can be appreciated, the strut 48 is exposed to inlet air flow C. A temperature sensor 56 is positioned at an upstream or radially outer position and a second temperature sensor 54 is positioned at a downstream radially inner location.

While the upstream location 56 is shown at the radially outer location, it should be understood that should the fluid be flowing radially outwardly the upstream location would be at the radially inner location. Moreover, while the temperature sensors are shown within a strut between a core engine outer housing and inner housing, the teachings of this disclosure could extend to fluids moving through the inlet air flow heading into the engine from any number of locations.

The strut 48 is positioned in a core inlet 58 between the core housing 45 and the inner housing 46, but it could be positioned in other locations. Moreover, while oil is disclosed in this embodiment, other fluids may be utilized for the general teachings of this disclosure.

At any rate, a location receiving an aircraft fluid that is exposed to the inlet airflow is preferably utilized. Whatever temperature the air flow (here core air C, but again the temperature may be sensed elsewhere) may be at, it will generally cool the fluid within the conduit 50 between locations 56 and 54. The temperature sensors 54 and 56 thus sense a temperature difference which is communicated to a control 100.

The control 100 may be a standalone controller, or may be a full authority digital electronic controller for the overall engine (FADEC). In the exemplary example, the control 100 also controls a deicing system such as ports 102 which receive heated air as from a source 106 which taps air from the compressor section 33 of the gas turbine engine 20.

The control 100 controls a valve 104 to selectively supply this air to ports 102. While this particular deicing system is shown deicing the radially inner surface of a fan case 105, there are a number of other deicing system which could be utilized within the broad teachings of this disclosure. This deicing system is illustrated merely for example.

Applicant has recognized the temperature differential between the sensors 54 and 56 will be a function of various atmospheric and gas turbine engine conditions including outside air temperature, air speed, fluid flow rate, fluid composition (e.g. oil, fuel, pressurized bleed air, etc.) and what condition the gas turbine engine may be at including idle, take off, cruise, etc. By accounting for the various atmospheric and gas turbine engine conditions a differential temperature threshold may be determined for the measured differential temperature of the fluid. The differential temperature threshold may correspond to a probability that icing conditions exist for the inlet at the current atmospheric and operational conditions.

The differential temperature threshold may be determined by analysis or testing of the gas turbine engine to determine differential temperature threshold. Look up tables may be developed for various atmospheric and gas turbine engine conditions. After determining differential temperature thresholds by test or analysis, the control 100 may be effectively programmed with information as shown in graphs like FIGS. 3 and 4.

Figure 3:
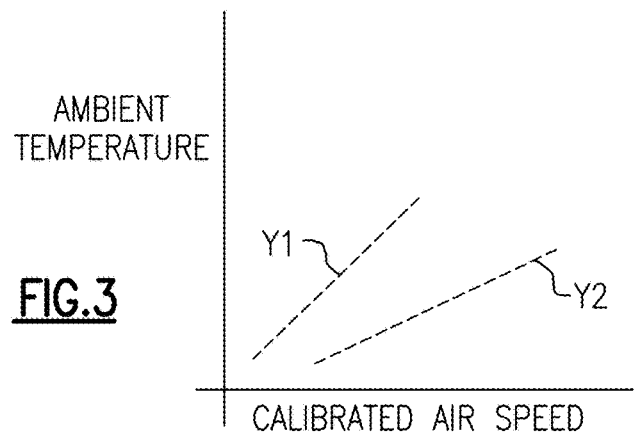
FIG. 3 shows a graph that may be associated with a control feature according to this disclosure.

As shown in FIG. 3, the ambient temperature and calibrated air speed might be plotted with distinct slopes $Y_1$ and $Y_2$ which correspond to the main oil temperatures A and main oil temperature B. If the air speed is to the right of the slopes $Y_1$ or $Y_2$ then this is likely indicative of icing conditions. One then looks at FIG. 4. If the delta temperature is above the slope Z, this is also indicative of an icing condition.

The main oil temperature is a temperature which is utilized by the engine control and provided to various control systems, and to the pilot, to provide an indication of the current temperature of the oil. While the location of the identified main oil temperature is not particularly controlling, for purposes of this disclosure, it is simply a reference temperature which may then be utilized to determine the likelihood of icing conditions.

Figure 4:
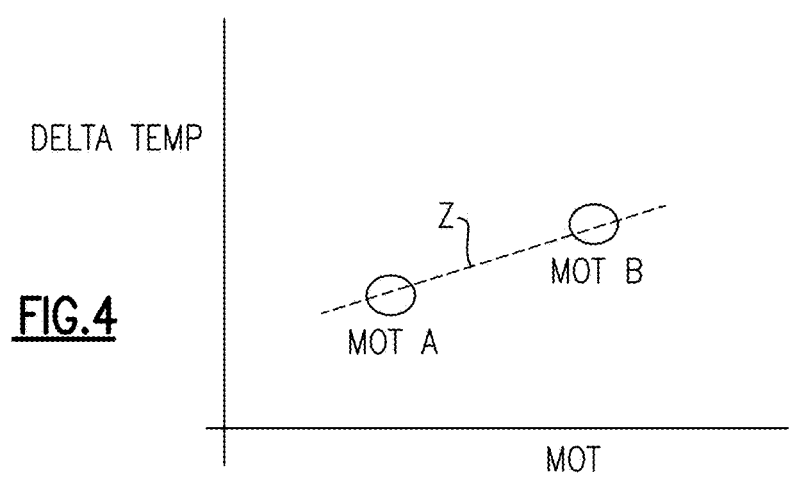
FIG. 4 shows another graph that may be associated with a control feature of this disclosure.

FIG. 4 equates a delta temperature with the main oil temperature ("MOT"). On the slope Z, it can be seen that distinct main oil temperatures would have distinct expected delta temperatures associated with a risk of icing.

If an icing condition is identified, and exists for a predetermined minimum time, then an icing condition may be identified. If an icing condition is identified, the engine control may take one or more actions such as executing a pilot notification. Exemplary pilot notifications might include a warning light, an audible alarm, etc. Alternatively, or in combination, the anti-icing system might be actuated by the control.

Figure 5:
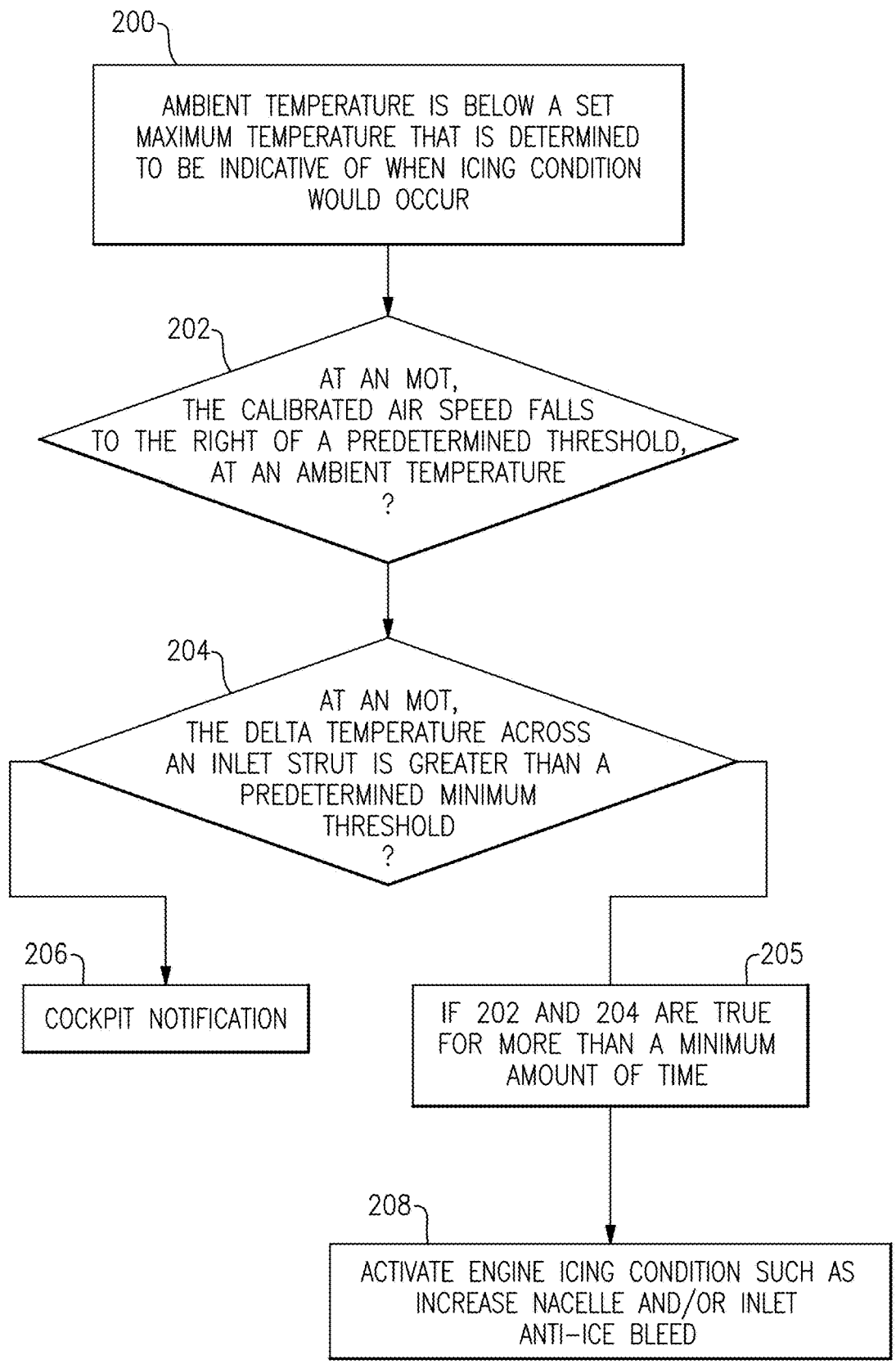
FIG. 5 shows a flow chart of a method and control associated with this disclosure.

FIG. 5 shows a block diagram for the method and control for which the control 100 is programmed.

Step 200 asks if the ambient temperature is below a set maximum temperature that is determined to be indicative of when icing conditions could occur. If so, at step 202 the calibrated air speed at an ambient temperature and MOT is determined. If the calibrated air speed is to the right of the slope (see FIG. 3), this is indicative of potential icing conditions.

At step 204 the control system will confirm icing conditions if the delta temperature is above a minimum threshold (FIG. 4) and for more than a predetermined minimum amount of time step 205.

At step 206 a cockpit notification might then occur. Alternatively, or in combination with step 206 an anti-icing measure could be automatically actuated at step 208.

The controller is programmed to associate a plurality of main oil temperatures, and relative to an ambient temperature and a calibrated air speed, and identify the icing condition should the current calibrated air speed at a current main oil temperature be greater than an identified calibrated air speed that might indicative potential icing.

The control is also programmed to identify a particular temperature differential with a particular reference fluid temperature to identify whether the icing condition is occurring.

In a featured embodiment, a gas turbine engine 20 includes a propulsor 24/26 for providing air into a core engine housing, and for providing air as propulsion air radially outwardly of the core engine housing. The core engine housing surrounds a compressor section. A combustor is positioned downstream of the compressor section and a turbine section is positioned downstream of the combustor. An aircraft fluid moves within an inlet to the gas turbine engine, and is exposed to inlet air at the inlet. There is a first temperature sensor 56 for sensing a first temperature of the aircraft fluid at a first upstream point and a second temperature sensor 54 for sensing a second temperature of the aircraft fluid at a second downstream point where the aircraft fluid has been exposed to the inlet air for a period of time. A control 100 determines a temperature differential between first and second temperatures sensed by the first and second temperature sensors. The temperature differential is associated with a likelihood that an icing condition will occur, and the control is programmed to take a corrective action should an icing condition be identified.

In another embodiment according to the previous embodiment, a strut 48 extends between an outer engine core housing 30 and an inner engine core housing 46 and the aircraft fluid passes through the strut.

In another embodiment according to any of the previous embodiments, the aircraft fluid is oil being routed through the strut to a heat exchanger 53.

In another embodiment according to any of the previous embodiments, a fan case 22 surrounds the propulsor, and the propulsor is a fan rotor. The fan rotor delivers air into a bypass duct defined between the fan case and the outer core engine housing, and the heat exchanger is positioned in the bypass duct.

In another embodiment according to any of the previous embodiments, the control 100 is programmed to identify a particular temperature differential with a particular reference fluid temperature to identify whether the icing condition is occurring.

In another embodiment according to any of the previous embodiments, the control 100 is programmed to identify the icing condition should the temperature differential continue to suggest an icing condition for a minimum period of time.

In another embodiment according to any of the previous embodiments, the aircraft fluid is oil, and the reference fluid temperature is a main oil temperature utilized by the control 100.

In another embodiment according to any of the previous embodiments, the controller 100 is also programmed to associate a plurality of main oil temperatures, and relative to an ambient temperature and a calibrated air speed, and identify the icing condition should the current calibrated air speed at a current main oil temperature be greater than an identified calibrated air speed that might indicative potential icing.

In another embodiment according to any of the previous embodiments, the aircraft fluid is oil being routed through the strut to a heat exchanger.

In another embodiment according to any of the previous embodiments, the control is programmed to identify the icing condition should the temperature differential continue to suggest an icing condition for a minimum period of time.

In another featured embodiment, a method of operating a gas turbine engine includes the steps of providing air from a propulsor into a core engine housing, and as propulsion air radially outwardly of the core engine housing. An aircraft fluid is moved within an inlet to the gas turbine engine, and exposed to inlet air 32. The method then senses a first upstream temperature 56 of the aircraft fluid and a second downstream temperature 54 after the aircraft fluid has been exposed to the inlet air for a period of time. A temperature differential is determined between the first and second temperatures. The temperature differential is associated with a likelihood that an icing condition will occur, and a corrective action is taken should an icing condition be identified.

In another embodiment according to any of the previous embodiments, a strut 48 extends between an outer engine core housing 30 and an inner engine core housing 46 and the aircraft fluid passing through the strut.

In another embodiment according to any of the previous embodiments, the aircraft fluid is oil routed through the strut to a heat exchanger 53.

In another embodiment according to any of the previous embodiments, a fan case 22 surrounds a fan rotor, and the propulsion air delivered by the fan rotor is delivered into a bypass duct 128 defined between the fan case and an outer core engine housing, and the heat exchanger 53 being positioned in the bypass duct.

In another embodiment according to any of the previous embodiments, a control 100 is programmed to identify a particular temperature differential with a particular reference fluid temperature to identify whether the icing condition is occurring.

In another embodiment according to any of the previous embodiments, the control 100 identifying the icing condition should the temperature differential continue to suggest an icing condition for a minimum period of time.

In another embodiment according to any of the previous embodiments, the aircraft fluid is oil, and the reference fluid temperature is a main oil temperature utilized by the control 100.

In another embodiment according to any of the previous embodiments, the controller 100 is also programmed to associate a plurality of main oil temperatures, and relative to an ambient temperature and a calibrated air speed, and identify the icing condition should the current calibrated air speed at a current main oil temperature be greater than an identified calibrated air speed that might indicative potential icing.

In another embodiment according to any of the previous embodiments, the aircraft fluid is oil routed through the strut to a heat exchanger 53.

In another embodiment according to any of the previous embodiments, the control identifying the icing condition should the temperature differential continue to suggest an icing condition for a minimum period of time.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine comprising:
    a propulsor for providing air into a core engine housing, and for providing air as propulsion air radially outwardly of the core engine housing;
    the core engine housing surrounding a compressor section, a combustor positioned downstream of the compressor section and a turbine section positioned downstream of the combustor;
    an aircraft fluid moving within an inlet to the gas turbine engine, the inlet receives the air from the propulsor as inlet air, and there being a first temperature sensor for sensing a first temperature of the aircraft fluid at a first location and a second temperature sensor for sensing a second temperature of the aircraft fluid at a second location, the first location radially outward of the second location; and
    a control configured to:
    determine that an icing condition exists based on a temperature difference between the first temperature and the second temperature exceeding a predefined threshold, and
    based on the determination that the icing condition exists, take a corrective action,
    wherein the core engine housing includes an outer engine core housing and an inner engine core housing, a strut extends between the outer engine core housing and the inner engine core housing, and the aircraft fluid passes through the strut,
    wherein the strut is exposed to the inlet air at the inlet, and
    wherein to take the corrective action, the control is configured to execute a pilot notification or actuate an anti-icing system.

2. The gas turbine engine as set forth in claim 1, wherein the aircraft fluid is oil being routed through the strut to a heat exchanger.

3. The gas turbine engine as set forth in claim 2, wherein a fan case surrounds the propulsor, and the propulsor being a fan rotor, and the fan rotor delivering air into a bypass duct defined between the fan case and the outer engine core housing, and the heat exchanger being positioned in the bypass duct.

4. The gas turbine engine as set forth in claim 1, wherein the control is configured to determine that the icing condition exists by comparing the temperature difference to a reference fluid temperature.

5. The gas turbine engine as set forth in claim 4, wherein the control is configured to further base the determination that the icing condition exists on the temperature difference being above a predetermined threshold for a minimum period of time.

6. The gas turbine engine as set forth in claim 4, wherein the aircraft fluid is oil, and the reference fluid temperature is a main oil temperature utilized by the control.

7. The gas turbine engine as set forth in claim 6, wherein the control is configured to further base the determination that the icing condition exists on an air speed and ambient temperature of the gas turbine engine.

8. The gas turbine engine as set forth in claim 1, wherein the control is configured to determine the icing condition exists should the temperature difference exceed the predefined threshold for a minimum period of time.

9. A method of operating a gas turbine engine comprising the steps of:
providing air from a propulsor into a core engine housing, and as propulsion air radially outwardly of the core engine housing;
moving an aircraft fluid within an inlet to the gas turbine engine, the inlet receives the air from the propulsor as inlet air, and sensing a first upstream temperature of the aircraft fluid and a second downstream temperature of the aircraft fluid; and
determining that an icing condition exists based on a temperature difference between the first temperature and the second temperature exceeding a predefined threshold, and based on the determination that the icing condition exists, taking a corrective action,
wherein the core engine housing includes an outer engine core housing and an inner engine core housing, a strut extends between the outer engine core housing and the inner engine core housing, and the aircraft fluid passes through the strut,
wherein the strut is exposed to the inlet air at the inlet, and
wherein taking the corrective action comprises a control executing a pilot notification or actuating an anti-icing system.

10. The method as set forth in claim 9, wherein the aircraft fluid is oil routed through the strut to a heat exchanger.

11. The method as set forth in claim 10, wherein a fan case surrounds the propulsor, and the propulsion air delivered by the propulsor is delivered into a bypass duct defined between the fan case and the outer engine core housing, and the heat exchanger is positioned in the bypass duct.

12. The method as set forth in claim 9, wherein a control is configured to determine that the icing condition exists by comparing the temperature difference to a reference fluid temperature.

13. The method as set forth in claim 12, wherein the control is configured to further base the determination that the icing condition exists on the temperature difference being above a predetermined threshold for a minimum period of time.

14. The method as set forth in claim 12, wherein the aircraft fluid is oil, and the reference fluid temperature is a main oil temperature utilized by the control.

15. The method as set forth in claim 14, wherein the control is configured to further base the determination that the icing condition exists on an air speed and ambient temperature of the gas turbine engine.

* * * * *